US010824731B2

(12) United States Patent
Liu et al.

(10) Patent No.: US 10,824,731 B2
(45) Date of Patent: Nov. 3, 2020

(54) SECURE BIOS ATTRIBUTE SYSTEM

(71) Applicant: Dell Products L.P., Round Rock, TX (US)

(72) Inventors: Wei G. Liu, Austin, TX (US); William Carl Munger, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 256 days.

(21) Appl. No.: 15/971,166

(22) Filed: May 4, 2018

(65) Prior Publication Data
US 2019/0340364 A1 Nov. 7, 2019

(51) Int. Cl.
*G06F 9/44* (2018.01)
*G06F 21/57* (2013.01)
*G06F 9/4401* (2018.01)
*H04L 9/08* (2006.01)
*H04L 29/06* (2006.01)
*G06F 21/44* (2013.01)

(52) U.S. Cl.
CPC .......... *G06F 21/572* (2013.01); *G06F 9/4401* (2013.01); *G06F 21/44* (2013.01); *G06F 21/575* (2013.01); *H04L 9/0894* (2013.01); *H04L 63/061* (2013.01); *H04L 63/0823* (2013.01); *H04L 63/12* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 7,174,465 | B2 * | 2/2007 | Freeman | G06F 21/57 713/170 |
| 9,148,413 | B1 * | 9/2015 | Marr | G06F 21/572 |
| 2012/0303943 | A1 * | 11/2012 | Tamura | G06F 21/44 713/2 |
| 2016/0246617 | A1 * | 8/2016 | Watsen | H04L 41/0886 |
| 2018/0191497 | A1 * | 7/2018 | Paczkowski | H04L 9/3236 |
| 2020/0014701 | A1 * | 1/2020 | Robison | H04L 63/105 |

OTHER PUBLICATIONS

"Dell Lifecycle Controller Graphical User Interface," Sep. 2014, 92 Pages, Version 2.00.00.00 for 13th Generation Dell PowerEdge Servers User's Guide, Dell Inc., http://www.dell.com/support/manuals/us/en/04/integrated-dell-remote-access-cntrllr-8-with-lifecycle-controller-v2.00.00.00/lc3_gui_2.00.00.00_ug-v1/uefi-secure-boot?guid=guid-e4ade546-1092-4eca-b802-c28de677bf42&lang=en-us.

* cited by examiner

*Primary Examiner* — Zahid Choudhury
(74) *Attorney, Agent, or Firm* — Haynes and Boone, LLP

(57) ABSTRACT

A secure Basic Input/Output System (BIOS) attribute system includes a secure server system coupled to a computing device through a network. The computing device receives a first BIOS attribute modification request, and authenticates the first BIOS attribute modification request using a first certificate that was previously stored in the computing device in response to validating the first certificate based on a key provided by the secure server system. In response to authenticating the first BIOS attribute modification request using the first certificate, the computing device modifies at least one BIOS attribute stored in the computing device.

20 Claims, 5 Drawing Sheets

SECURE BIOS ATTRIBUTE SYSTEM

BACKGROUND

The present disclosure relates generally to information handling systems, and more particularly to securing Basic Input/Output System (BIOS) attributes for a BIOS in an Information Handling System.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop computing devices, and/or other computing devices known in the art, typically include a Basic Input/Output System (BIOS) that is provided by non-volatile firmware that is configured to perform hardware initialization during a booting process for the computing device, as well as provide runtime services for operating system and applications executed by the computing device. Conventionally, access to the BIOS and the ability to change BIOS attributes for that BIOS that are stored in a BIOS database is provided via BIOS interfaces such as, for example, BIOS interfaces that enable attribute changes via the Serial Peripheral Interface (SPI) flash region of the BIOS, interfaces that enables attribute changes via sideband channels, and/or other BIOS interfaces known in the art. Such conventional BIOS interfaces are not completely secure, as while those interfaces may be enabled with password protection, such password protection is often not activated by users, and when activated provides for relatively weak protection. As such, knowledge of the BIOS interface and/or determination of a password enabled for the BIOS allows for the modification of BIOS attributes to alter computing system behavior, or even disable security features such as, for example, Secure Boot, which is described in the Unified Extensible Firmware Interface 2.3.1 specification and enforced via a Secure Boot enable/disable setup option in the BIOS.

Accordingly, it would be desirable to provide a secure BIOS attributes system.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: receive a first BIOS attribute modification request; authenticate, using a first certificate that was previously stored in a secure storage subsystem in response to validating the first certificate based on a key, the first BIOS attribute modification request; and modify, in response to authenticating the first BIOS attribute modification request using the first certificate, at least one BIOS attribute stored in a BIOS storage.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
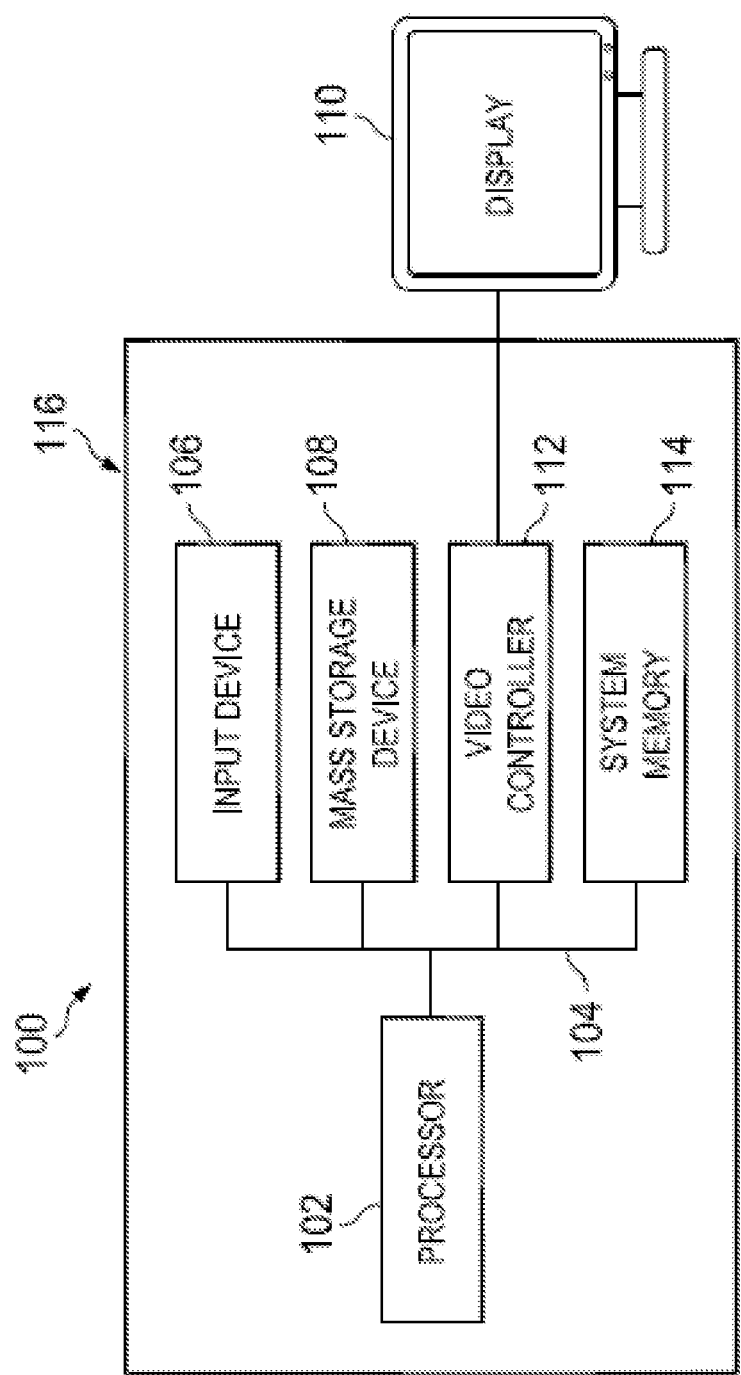
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
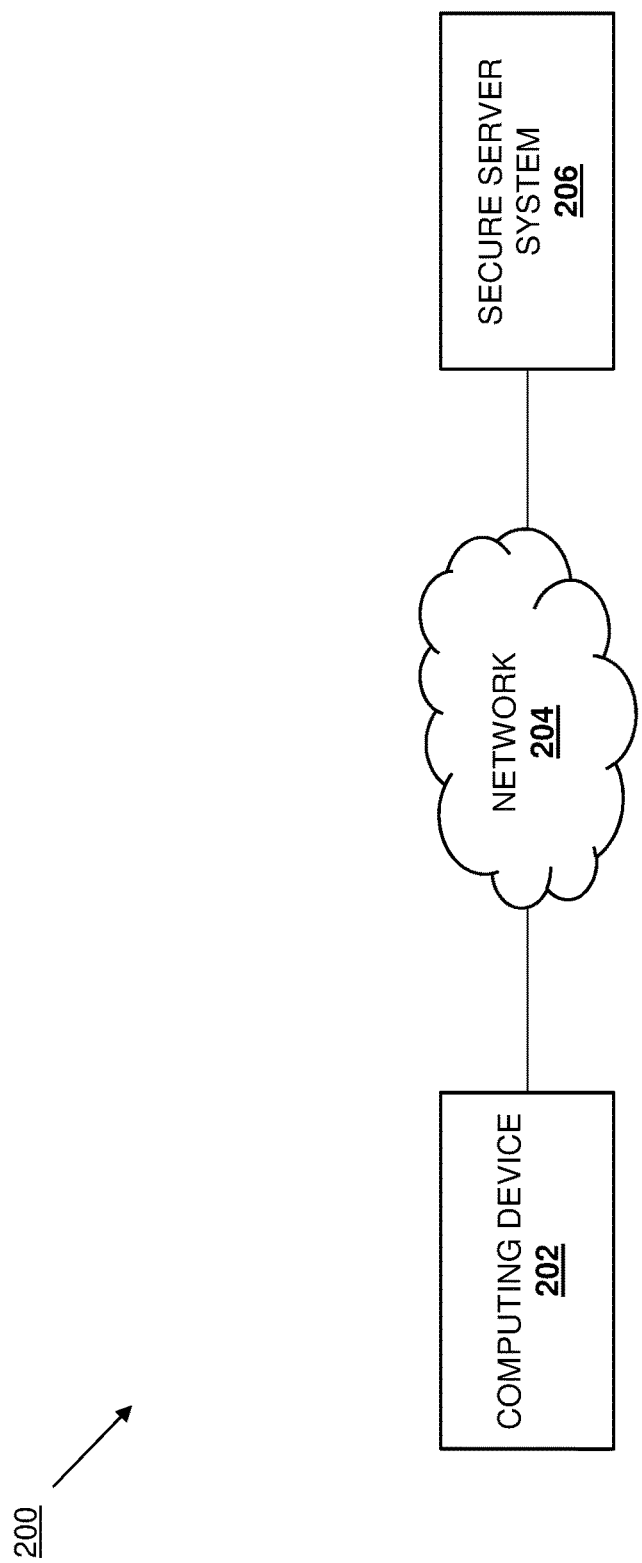
FIG. 2 is a schematic view illustrating an embodiment of a secure BIOS attribute system.

Referring now to FIG. 2, an embodiment of a secure BIOS attribute system 200 is illustrated. In the illustrated embodiment, the secure BIOS attribute system 200 includes a computing device 202, which may be provided by the IHS 100 discussed above with reference to FIG. 1, and/or may include some or all of the components of the IHS 100. In specific examples, the computing device 202 may be provided by a server device, a networking device (e.g., a switch device, a router device, etc.), a desktop computing device, a laptop/notebook computing device, and/or a variety of other computing devices that would be apparent to one of skill in the art in possession of the present disclosure. In the embodiment illustrated in FIG. 2, the computing device 202 is coupled through a network 204 to the secure server system 206. One of skill in the art in possession of the present disclosure will recognize that the network 204 is described below as a Local Area Network (LAN), but in other embodiments may include the Internet and/or other network or network combinations while remaining within the scope of the present disclosure. The secure server system 206 may include one or more server devices that are configured to provide the keys, perform the certificate validation, and/or perform any of the other secure server system functionality discussed below. For example, the secure server system 206 may be configured to store and/or transmit keys such as, for example, the Key Exchange Key (KEK) public/private key pairs (e.g., an X509 key, a RSA 2048 key, etc.) that are utilized below to sign and validate the certificates that enabled the BIOS attribute modifications as discussed below. However, in some embodiments, the secure server system 206 may be omitted, with the keys utilized in the present disclosure provided/stored in the computing device 202, as also detailed below.

Figure 3:
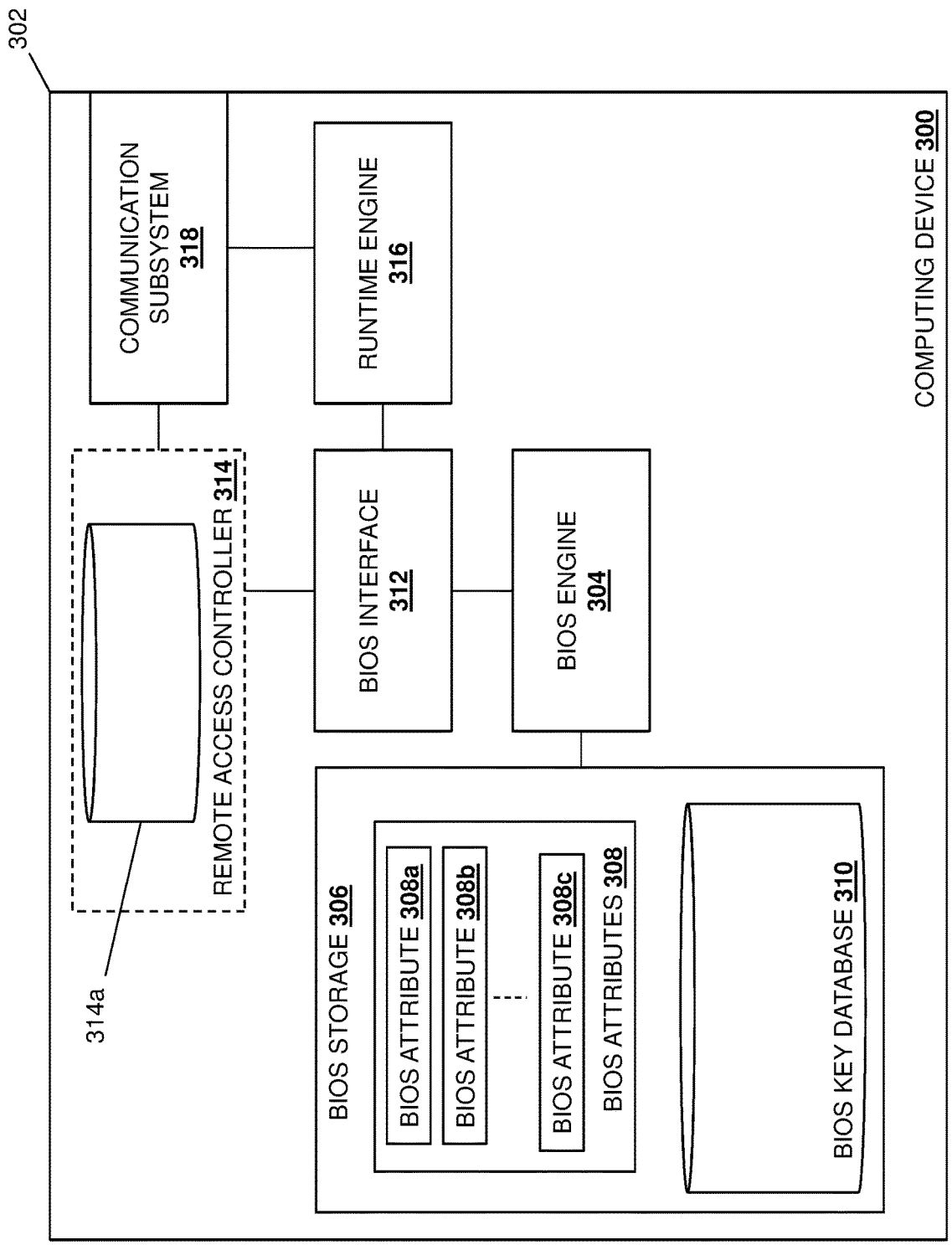
FIG. 3 is a schematic view illustrating an embodiment of a computing device used in the secure BIOS attribute system of FIG. 2.

Referring now to FIG. 3, an embodiment of a computing device 300 is illustrated that may be the computing device 200 discussed above with reference to FIG. 2. As such, the computing device 300 may be provided by the IHS 100 discussed above with reference to FIG. 1, and/or may include some or all of the components of the IHS 100, and in specific embodiments may be provided by a server device, a networking device (e.g., a switch device, a router device, etc.), a desktop computing device, a laptop/notebook computing device, and/or a variety of other computing devices that would be apparent to one of skill in the art in possession of the present disclosure. In the illustrated embodiment, the computing device 300 includes a chassis 302 that houses the components of the computing device 300, only some of which are illustrated in FIG. 3. For example, the chassis 302 may house a BIOS processing system (not illustrated, but which may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS engine 304 that is configured to perform the functions of the BIOS engines and computing devices discussed below. One of skill in the art in possession of the present disclosure will recognize that the BIOS engine 304 may be provided by non-volatile firmware in the computing device 300 that is also configured to perform conventional BIOS functions such as hardware initialization during a booting process for the computing device 300, runtime services for operating system and applications executed by the computing device 300, and/or any other BIOS functionality know in the art. Furthermore, while the term "BIOS" is used, one of skill in the art in possession of the present disclosure will recognize that the BIOS engine 304 may operate according to the Universally Extensible Firmware Interface (UEFI) specification while remaining within the scope of the present disclosure.

The chassis 302 may also house a BIOS storage 306 that is coupled to the BIOS engine 304. While the BIOS storage 306 is illustrated as coupled to the BIOS engine 304 (e.g., via a coupling between the BIOS storage 306 and the BIOS processing system that provides the BIOS engine 304), the BIOS storage 306 may be part of a BIOS that includes the BIOS engine 304 while remaining within the scope of the present disclosure. In a specific example, the BIOS storage 306 may be provided by a Serial Peripheral Interface (SPI) flash device, although other storage devices may fall within the scope of the present disclosure as well. In the illustrated embodiment, the BIOS storage 306 is illustrated as storing BIOS attributes 308 that include a BIOS attribute 308a, a BIOS attribute 308b, and up to a BIOS attribute 308c. In a specific example, the BIOS attributes 308 may include logical processor enable/disable attributes, integrated Redundant Array of Independent Disks (RAID) controller enable/disable attributes, and/or a variety of other BIOS attributes that would be apparent to one of skill in the art in possession of the present disclosure. In the illustrated embodiment, the BIOS storage 306 also includes a BIOS key database 310 that is configured to store the keys (e.g., the KEKs discussed herein) that provide for the validation of certificates used to enabled BIOS attribute modifications, discussed in further detail below. While a few specific elements that may be stored in the BIOS storage 308 have been described, one of skill in the art in possession of the present disclosure recognize that the BIOS storage may store a variety other BIOS storage elements while remaining within the scope of the present disclosure.

The chassis 302 may also house a BIOS interface 312 that is coupled to the BIOS engine 304 (e.g., via a coupling with the BIOS processing system that provides the BIOS engine 304) and that may include a Remote Access Controller ADMinistrator (RACADM) interface, a Web Services MANagement (WSMAN) interface, and/or a variety of other BIOS interfaces that would be apparent to one of skill in the art in possession of the present disclosure. As illustrated, the chassis 302 may house an optional remote access controller 314 that is coupled to the BIOS interface 312 (e.g., via a coupling with the RACADM interface discussed above) and that may be provided by, for example, a integrated Dell Remote Access Controller (iDRAC) provided by DELL® Inc. of Round Rock, Tex., United States. The remote access controller 314 includes a secure storage subsystem 314a that, as discussed below, may be provided by a credential vault that is configured to securely store the keys (e.g., the KEKs discussed herein) provided by the secure server system 206. However, in some embodiments, the remote access controller 314 may be omitted, and a secure storage subsystem that is similar to the secure storage subsystem 314a may be provided by, for example, a key management server, and/or a variety of other secure storage subsystems that would be apparent to one of skill in the art in possession of the present disclosure.

The chassis 302 may also house a primary processing system (not illustrated, but which may include the processor 102 (e.g., a Central Processing Unit (CPU)) discussed above with reference to FIG. 1) and a primary memory system (not illustrated, but which may include the memory 114 discussed above with reference to FIG. 1) that is coupled to the primary processing system and that includes instructions that, when executed by the primary processing system, cause the primary processing system to provide a runtime engine 316 that is configured to provide the runtime functionality (e.g., operating system functionality, application functionality, and/or other runtime functionality that would be apparent to one of skill in the art in possession of the present disclosure) of the runtime engines and computing devices discussed below. The runtime engine 312 is coupled to the BIOS interface (e.g., via a coupling between the primary processing system and the BIOS interface 312). The chassis 302 may also house a communication subsystem 318 that is coupled to the runtime engine 316 (e.g., via a coupling between the primary processing system and the communication subsystem 318) and to the remote access controller 314 (when present in the chassis 302), and that may be provided by a Network Interface Controller (NIC), a wireless communication subsystem (e.g., a WiFi communication subsystem, a BLUETOOTH® communication subsystem, a Near Field Communication (NFC) subsystem, and/or other wireless communication subsystems know in the art), and/or any other communication components that would be apparent to one of skill in the art in possession of the present disclosure. While a specific computing device 300 has been illustrated and described, one of skill in the art in possession of the present disclosure will recognize that computing devices may include other components and/or component configurations for performing conventional functionality, as well as the functionality discussed below, while remaining within the scope of the present disclosure.

Figure 4:
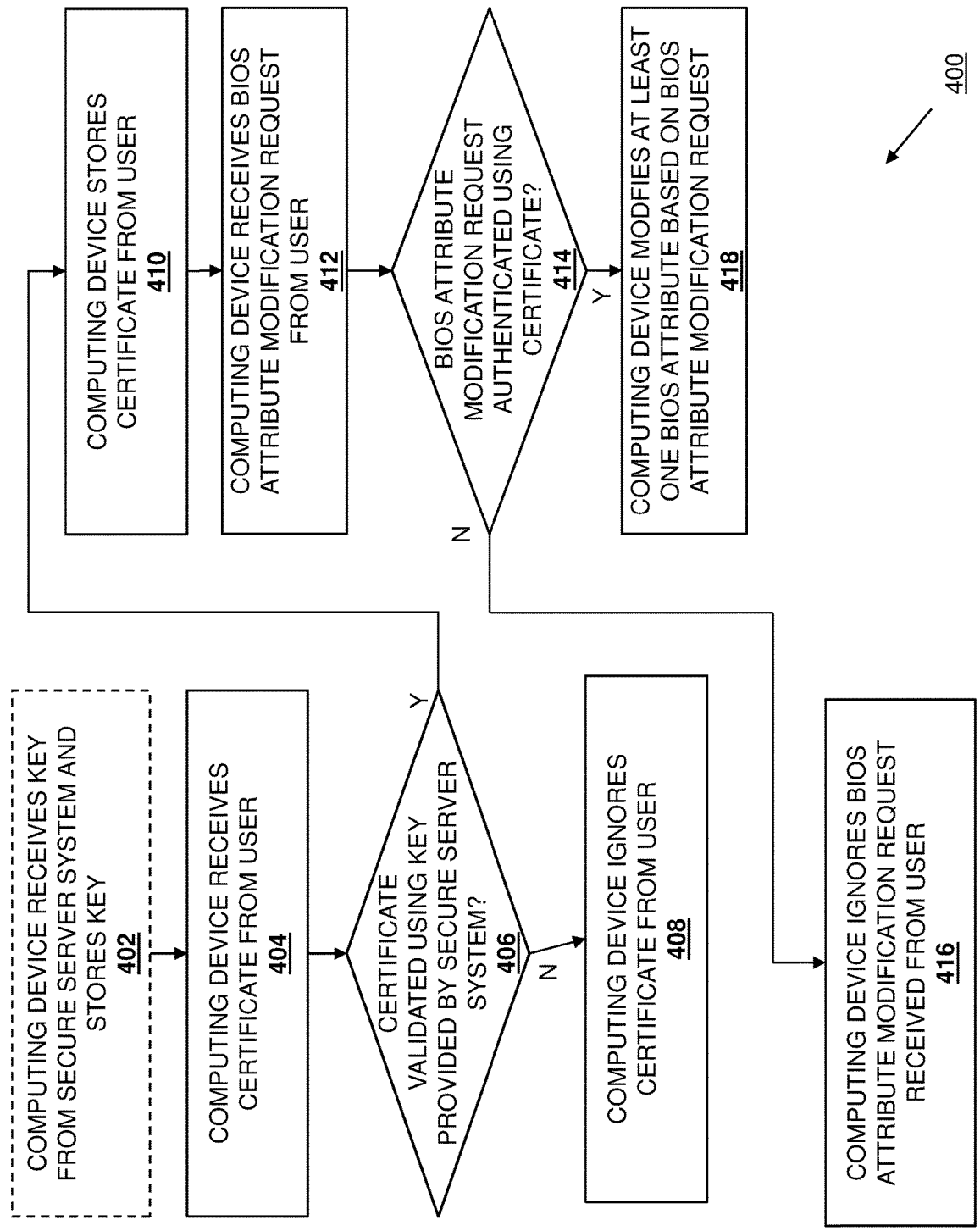
FIG. 4 is a flow chart illustrating an embodiment of a method for securing BIOS attributes.

Referring now to FIG. 4, an embodiment of a method 400 for securing BIOS attributes is illustrated. As discussed below, the systems and methods of the present disclosure provide for the securing of BIOS attributes for a BIOS in a computing device via the enrollment of a certificate in a secure storage subsystem in the computing device, with the certificate validated by a key that may be provided by a network-connected secure server system. Subsequently, when a user of the computing device would like to modify any of the BIOS attributes of the BIOS, the user signs a BIOS attribute modification request (that includes those BIOS attribute modifications) with a private key, and provides that BIOS attribute modification request to the BIOS. The BIOS may then operate to attempt to authenticate the private-key-signed BIOS attribute modification request with a public key identified by the certificate that was validated and enrolled in the secure storage subsystem of the computing device. If the BIOS attribute modification request cannot be authenticated using a validated certificate that is enrolled in the secure storage subsystem, it will be ignored. However, if the BIOS attribute modification request is authenticated using a validated certificate that is enrolled in the secure storage subsystem, the BIOS attributes modifications included in the BIOS attribute modification request are used to modify at least one BIOS attribute in the BIOS. As such, an unauthorized user is prevented from modifying BIOS attributes without access to the private key that may be authenticated by a previously validated certificate in the secure storage subsystem.

Figure 5:
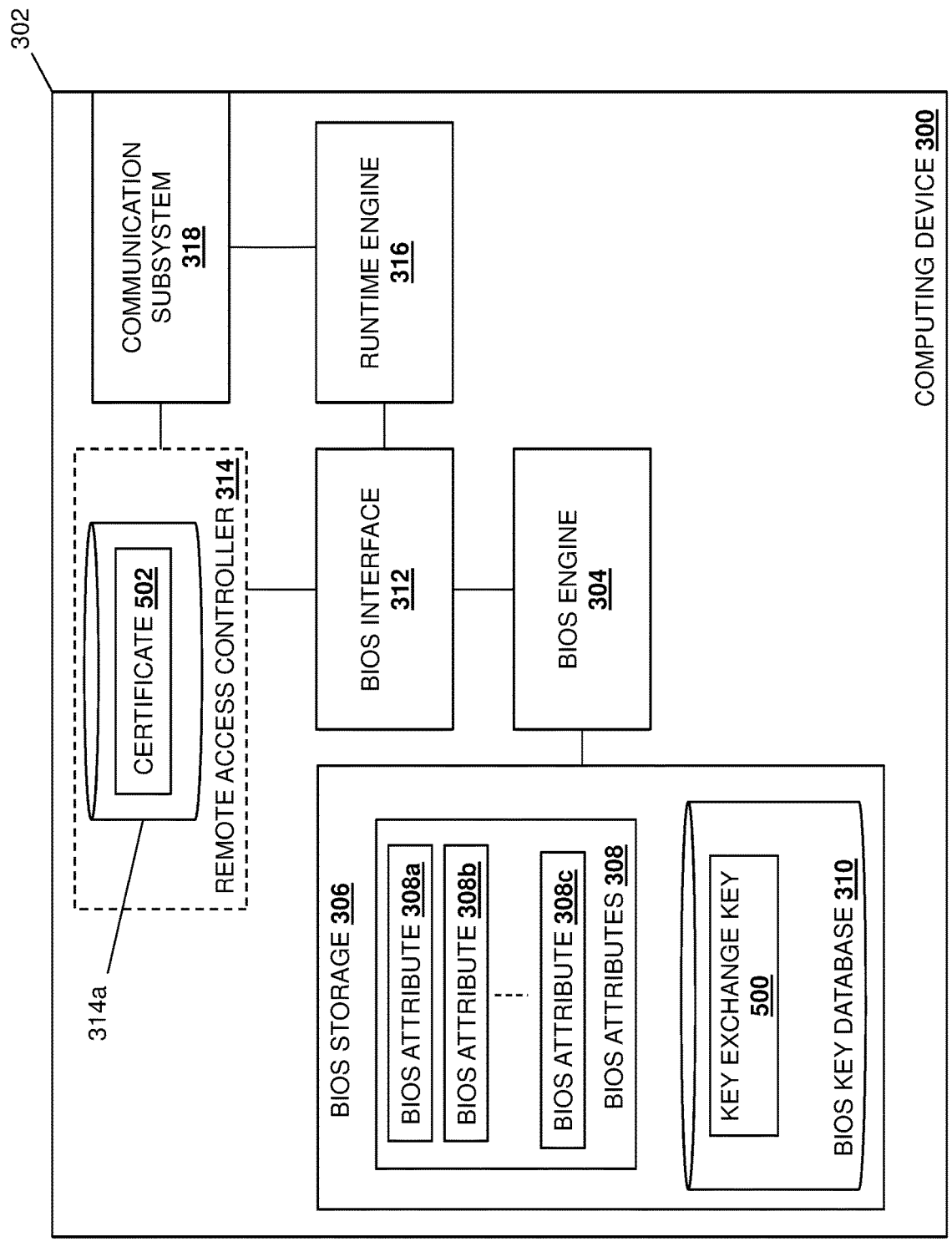
FIG. 5 is a schematic view illustrating an embodiment of the computing device of FIG. 3 during the method of FIG. 4.

The method 400 may begin at optional block 402 where a computing device receives a key from a secure server system, and stores that key. In an embodiment, at optional block 402, the secure server system 206 may transmit a key such as, for example, a public key portion of a Key Exchange Key (KEK), through the network 204 to the computing device 202. As would be understood by one of skill in the art in possession of the present disclosure, a KEK may establish a trust relationship between the certificates described below and platform firmware, and may include a public key portion that may be stored in a secure storage subsystem on the computing device 202. In some embodiments, the secure server system 206 may control a Platform Key (PK) that may be utilized to update KEKs on the computing device 202. In a specific example, the PK and KEKs may be controlled by a manufacturer of the computing device 202 that operates the secure server system 206, although the control of the keys of the present disclosure by other entities will fall within its scope as well. At optional block 402, the BIOS engine 304 may receive the public portion of the KEK through the network 204 (e.g., via the communication subsystem 318, the runtime engine 316, and the BIOS interface 312) from the secure server system 206, and in some embodiments may operate to verify that the KEK has been signed with a private portion of the PK (e.g., using a public portion of the PK that was previously stored in the BIOS key database 310). With reference to FIG. 5, in the event that the public key portion of the KEK received from the secure server system 206 is verified, the BIOS engine 304 may store that public key portion of the KEK 500 in the BIOS key database 310. In the event that the public key portion of the KEK cannot be verified, the remote access controller 314 may discard that public key portion of the KEK. While the public key portion of the KEK 500 is described as being stored in the BIOS key database 310, one of skill in the art in possession of the present disclosure will recognize that the storage of the key at optional block 402 in some other storage subsystem in the computing device 300 will fall within the scope of the present disclosure as well.

However, in other embodiments, optional block 402 may be omitted and the key may be provided in the computing device 202 during its manufacture. For example, a manufacturer of the computing device 202 may provide the public key portion of the KEK 500 in the BIOS key database 310, and/or in any other storage subsystem in the computing device 202. In yet other embodiments, optional block 402 may be omitted and the key may remain at the secure server system 206 for use in verifying certificates remotely, as discussed in further detail below. Thus, while a few examples of the provisioning and storage of keys such as KEKs in different manners has been described, one of skill in the art in possession of the present disclosure will recognize that the key utilized by the systems and methods of the present disclosure may be provisioned and/or stored in a variety of manners that will fall within the scope of the present disclosure.

The method 400 may also begin at block 404, or may proceed to block 404 following optional block 402. At block 404, the computing device receives a certificate from a user. In an embodiment, at block 404, a user may use the runtime engine 316 (e.g., via input devices such as the input device 106 discussed above with reference to FIG. 1) to attempt to enroll a certificate in a secure storage subsystem of the computing device 300 in order to enable a secure BIOS attributes mode in the computing device 202/300. For example, the runtime engine 316 may be configured to create a certificate using a Hardware Security Module (HSM), retrieve a certificate via Open Secure Socket Layer (OpenSSL) communications with the secure server system 206, and/or utilize a variety of other certificate creation/retrieval methods that would be apparent to one of skill in the art in possession of the present disclosure. In yet another embodiment, the remote access controller 314 may store a private key in the secure storage subsystem 314a (e.g., using the credential vault provided in the iDRAC available from DELL® Inc. of Round Rock, Tex., United States), and may provide a signing service that allows for the signing of certificates using that private key.

In a specific example, the certificate created by the user at block 404 may be signed with a private key that is associated with the public portion of the KEK that is provided by the secure server system 206. As such, at block 404, the runtime engine 316 may create and provide the certificate through the BIOS interface 312 to the BIOS engine 304. In another embodiment, the certificate received by the BIOS engine 304 at block 404 may be provided by the secure server system 206 remotely through the network 204 and via the communication subsystem 318 to the remote access controller 314, and the remote access controller 314 may provide that certificate through the BIOS interface 312 to the BIOS engine 304. In yet another embodiment, the certificate received by the BIOS engine 304 at block 404 may be signed using a signing service in the remote access controller 314, and then provided by the remote access controller 314 through the BIOS interface 312 to the BIOS engine 304. While a few examples have been described, one of skill in the art in possession of the present disclosure will recognize that certificates may be created and/or provided to the BIOS engine 304 in a variety of manners that will fall within the scope of the present disclosure as well.

The method 400 then proceeds to decision block 406, where it is determined whether the certificate has been validated using a key provided by a secure server system. In some embodiments, at decision block 406 the BIOS engine 304 may operate to validate the certificate received at block 404 using the key received from the secure server system 206 at block 402. For example, the BIOS engine 304 may use the public portion of the KEK 500 that was received from the secure server system 206 and stored in the BIOS key database 310 (or other secure storage subsystem in the computing device 202/300) at block 402 to validate the certificate by determining whether the certificate has been signed using a private portion of the KEK. In other embodiments, at decision block 406 the BIOS engine 304 may operate to validate the certificate received at block 404 using the key that was stored in the computing device 202/300 upon its manufacture. For example, the BIOS engine 304 may use the public portion of the KEK 500 that was stored in the BIOS key database 310 (or other secure storage subsystem in the computing device 202/300) by the manufacturer of the computing device 202/300 to validate the certificate by determining whether the certificate has been signed using a private portion of the KEK. In yet another embodiment, the BIOS engine 304 may provide the certificate received at block 404 (or information about that certificate) through the network 204 (e.g., via the BIOS interface 312, the remote access controller 314, and the communication subsystem 318) to the secure server system 206. The secure server system 206 may then operate to validate the certificate by determining whether the certificate has been signed using a private portion of the KEK, and is configured to provide the BIOS engine 304 a certificate validation result communication (e.g., through the network 204 and via the communication subsystem 318, the remote access controller 314, and the BIOS interface 312) that indicates whether the certificate was validated (i.e., was signed with a public portion of the KEK that is stored in the secure server system 206.) While a few specific examples of local and remote certificate validation have been described, one of skill in the art in possession of the present disclosure will recognize that certificate validation may be performed in a variety of manners that will fall within the scope of the present disclosure.

If, at decision block 406, it is determined that the certificate has not been validated using the key, the method 400 proceeds to block 408 where the computing device ignores the certificate received from the user. In an embodiment, at block 408, the BIOS engine 304 may determine that the certificate received at block 404 was not signed with private portion of the KEK (e.g., using the public portion of the KEK 500 that was received from the secure server system 206 and stored in the BIOS key database 310 at block 402, using the public key portion of the KEK 500 that was provided in the BIOS key database 310 upon the manufacture of the computing device 300, or based on a certificate validation result communication received from the secure server system 206.) In response to determining that the certificate received at block 404 was not signed with the private portion of the KEK, the BIOS engine 304 may discard, delete, or otherwise ignore that certificate.

If, at decision block 406, it is determined that the certificate has been validated using the key, the method 400 proceeds to block 410 where the computing device stores the certificate received from the user. In an embodiment, at block 410, the BIOS engine 304 may determine that the certificate received at block 404 was signed with private portion of the KEK (e.g., using the public portion of the KEK 500 that was received from the secure server system 206 and stored in the BIOS key database 310 at block 402, using the public key portion of the KEK 500 that was provided in the BIOS key database 310 upon the manufacture of the computing device 300, or based on a certificate validation result communication received from the secure server system 206.) In response to determining that the certificate received at block 404 was signed with the private portion of the KEK, the BIOS engine stores that certificate 502 in the secure storage subsystem in the computing device 300. For example, as illustrated in FIG. 5, the certificate 502 may be stored in the secure storage subsystem 314a in the remote access controller 314 at block 410.

The method 400 then proceeds to block 412 where the computing device receives a BIOS attribute modification request from a user. In an embodiment, at block 412, a local user wishing to modify BIOS attributes for the BIOS of the computing device 300 may use the runtime engine 316 (e.g., via input devices such as the input device 106 discussed above with reference to FIG. 1) to create a BIOS attribute modification request that includes BIO attributes modifications for one or more of the BIOS attributes 308, and may sign that BIOS attribute modification request with a private key that is associated with the certificate 502 that was stored in the secure storage subsystem 314a in the remote access controller 314. In another embodiment, at block 412, a remote user wishing to modify BIOS attributes in the BIOS of the computing device 300 may create a BIOS attribute modification request that includes BIO attribute modifications to one or more of the BIOS attributes 308, may sign that BIOS attribute modification request with a private key that is associated with the certificate 502 that was stored in the secure storage subsystem 314a in the remote access controller 314, and may provide that BIOS attribute modification request through the network 204 to the BIOS engine 304 (e.g., via the communication subsystem 318, the remote access controller 314, and the BIOS interface 312. The BIOS attribute modification request may include modifications to any of the BIOS attributes 308 such as, for example, the logical processor enable/disabled attributes and/or integrated RAID controller enable/disable attributes discussed above, and/or any other BIOS attributes that would be apparent to one of skill in the art in possession of the present disclosure.

In an embodiment, a private key used to sign a BIOS attribute modification request by a user at block 412 may be stored in a device or other location that is separate from the computing device 300. For example, the private key used to sign a BIOS attribute modification request by a user at block 412 may be stored in the secure server system 206, and the user may create the BIOS attribute modification request using the runtime engine 316, send that BIOS attribute modification request through the network 204 (e.g., via the communication subsystem 318) to the secure server system 206 for signing with the private key associated with the certificate 502, receive that private-key-signed BIOS attribute modification request through the network 204 (e.g., via the communication subsystem 318) from the secure server system 206, and provide that private-key-signed BIOS attribute modification request through the BIOS interface 312 to the BIOS engine 304.

In another example, the private key used to sign a BIOS attribute modification request by a user at block 412 may be stored in a hardware device that is separate from the computing device 300, and the user may create the BIOS attribute modification request using the runtime engine 316, provide that BIOS attribute modification request to the hardware device (e.g., via a Universal Serial Bus (USB) connector on the communication subsystem 318 to which the hardware device is connected) for signing with the private key associated with the certificate 502, receive that private-key-signed BIOS attribute modification request back from the hardware device, and provide that private-key-signed BIOS attribute modification request through the BIOS interface 312 to the BIOS engine 304.

In yet another example, the private key used to sign a BIOS attribute modification request by a user at block 412 may be stored in a hardware device that is separate from the computing device 300 and connected to the computing device 202/300 through the network 204, and a remote user may create the BIOS attribute modification request using the hardware device and sign that BIOS attribute modification request with the private key associated with the certificate 502 using the hardware device, and provide that private-key-signed BIOS attribute modification request through the network to the BIOS engine 304 (e.g., via the communication subsystem 318, the remote access controller 314, and the BIOS interface 312.) While a few examples of providing a private-key-signed BIOS attribute modification request have been provided, one of skill in the art in possession of the present disclosure will recognize that the signing of the BIOS attribute modification request may be performed in a variety of manners that will fall within the scope of the present disclosure.

The method 400 then proceeds to decision block 414, where it is determined whether the BIOS attribute modification request has been authenticated using a certificate. In an embodiment, at decision block 414, the BIOS engine 304 may determine whether the BIOS attribute modification request received at block 412 can be authenticated using a certificate. For example, at decision block 414, the BIOS engine 304 may determine whether the BIOS attribute modification request is authentic using the certificate 502 stored in the secure storage subsystem 314a in the remote access controller 314 (or other secure storage subsystem in the computing device 300) by accessing the secure storage subsystem 314a via the BIOS interface 312 and determining whether a public key identified by the certificate 502 verifies that the BIOS attribute modification request received at block 412 was signed with a private key associated with that certificate 502. In another example, at decision block 414, the BIOS engine 304 may determine whether the BIOS attribute modification request has been authenticated using the certificate 502 stored in the secure storage subsystem 314a in the remote access controller 314 (or other secure storage subsystem in the computing device 300) by providing the BIOS attribute modification request to the remote access controller 314 via the BIOS interface 312, and receiving an indication from the remote access controller 314 of whether a public key identified by the certificate 502 verifies that the BIOS attribute modification request received at block 412 was signed with a private key associated with that certificate 502. While a few examples of the determination of the authentication of a BIOS attribute modification request have been described, one of skill in the art in possession of the present disclosure will recognize that a BIOS attribute modification request may be authenticated via the certificate of the present disclosure in a variety of manners that will fall within the scope of the present disclosure as well.

If, at decision block 414, it is determined that the BIOS attribute modification request has not been authenticated using the certificate, the method 400 proceeds to block 416 where the computing device ignores the BIOS attribute modification request received from the user. In an embodiment, at block 416, the BIOS engine 304 may determine that the BIOS attribute modification request received at block 412 was not authenticated using the certificate 502 (e.g., no validated certificates in the secure storage subsystem of the computing device 300 identify a public key that verifies that the received BIOS attribute modification request was signed with a private key associated with that certificate) In response to determining that the BIOS attribute modification request was not authenticated using the certificate 502, the BIOS engine 304 may discard, delete, or otherwise ignore that BIOS attribute modification request, and in some embodiments may provide a security violation communication to a user of the computing device 300 (e.g., via the runtime engine 316) and/or to the secure server system 206.

If, at decision block 414, it is determined that the BIOS attribute modification request has been authenticated using the certificate, the method 400 proceeds to block 418 where the computing device modifies at least one BIOS attribute based on the BIOS attribute modification request. In an embodiment, at block 418, the BIOS engine 304 may determine that the BIOS attribute modification request received at block 412 was authenticated using the certificate 502 (e.g., using a public key that is identified by the certificate 502 and that verifies that the received BIOS attribute modification request was signed with a private key associated with that certificate 502.) In response to determining that the BIOS attribute modification request was authenticated using the certificate 502, the BIOS engine 304 may retrieve the BIOS attribute modification(s) from the BIOS attribute modification request, and use those BIOS attribute modification(s) to modify any of the BIOS attributes 308, 308b, and/or 308c identified by the BIOS attribute modification(s). As such, the BIOS attribute modification request may provide for BIOS attribute modifications such as, for example, modifications of the logical processor enable/disabled attributes and/or integrated RAID controller enable/disable attributes discussed above, and/or for the modification of any other BIOS attributes that would be apparent to one of skill in the art in possession of the present disclosure Thus, systems and methods have been described that provide for the securing of BIOS attributes for a BIOS in a computing device via the storage of a certificate in a secure storage subsystem in the computing device, with the certificate validated by a key provided by a secure server system. Subsequently, remote modification of any of the BIOS attributes of the BIOS is desired, a BIOS attribute modification request (that includes those BIOS attribute modifications) may be signed with a private key and provided to the BIOS. The BIOS may then operate to attempt to authenticate the private-key-signed BIOS attribute modification request with a public key identified by the certificate that was validated and enrolled in the secure storage subsystem of the computing device. If the BIOS attribute modification request cannot be authenticated using a validated certificate that is enrolled in the secure storage subsystem, it will be ignored. However, if the BIOS attribute modification request is authenticated using a validated certificate that is enrolled in the secure storage subsystem, the BIOS attributes modifications included in the BIOS attribute modification request are used to modify at least one BIOS attribute in the BIOS. As such, a unauthorized user is prevented from remotely modifying BIOS attributes without access to the private key that may be authenticated by a previously validated certificate in the secure storage subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure Basic Input/Output System (BIOS) attribute system, comprising:
   a secure server system; and
   a computing device that is coupled to the secure server system through a network, wherein the computing device is configured to:
   receive a first BIOS attribute modification request;
   authenticate, using a first certificate that was stored in the computing device prior to the receiving the first BIOS attribute modification request and in response to validating the first certificate based on a key provided by the secure server system, the first BIOS attribute modification request; and
   modify, in response to authenticating the first BIOS attribute modification request using the first certificate, at least one BIOS attribute stored in the computing device.

2. The system of claim 1, wherein the computing device is configured to:
   receive, through the network from the secure sever system, the key;
   store the key in a BIOS storage that is included in the computing device;
   receive the first certificate;
   validate the first certificate using the key; and
   store, in response to validating the first certificate, the first certificate in a secure storage subsystem in the computing device.

3. The system of claim 2, wherein the secure storage subsystem is included in a remote access controller that is included in the computing device.

4. The system of claim 1, wherein the computing device is configured to:
   receive the first certificate;
   provide, through the network to the secure server system, the first certificate;
   receive, through the network from the secure server system, a validation of the first certificate that is based on the key that is stored in the secure server system; and
   store, in response to receiving the validation, the first certificate in a secure storage subsystem in the computing device.

5. The system of claim 1, wherein the computing device is configured to:
   receive a second certificate;
   determine that the second certificate cannot be validated using a key that is provided by the secure server system; and
   ignore, in response to determining that the second certificate cannot be validated, the second certificate.

6. The system of claim 1, wherein the computing device is configured to:
   receive a second BIOS attribute modification request;
   determine that the second BIOS attribute modification request cannot be authenticated using any certificates that were previously stored in the computing device; and
   ignore, in response to determining that the second BIOS attribute modification request cannot be authenticated, the second BIOS attribute modification request.

7. An Information Handling System (IHS), comprising:
   a processing system; and
   a memory system that is coupled to the processing system and that includes instructions that, when executed by the processing system, cause the processing system to provide a Basic Input/Output System (BIOS) engine that is configured to:
   receive a first BIOS attribute modification request;
   authenticate, using a first certificate that was stored in a secure storage subsystem prior to the receiving the first BIOS attribute modification request and in response to validating the first certificate based on a key, the first BIOS attribute modification request; and
   modify, in response to authenticating the first BIOS attribute modification request using the first certificate, at least one BIOS attribute stored in a BIOS storage.

8. The IHS of claim 7, wherein the BIOS engine is configured to:
   receive, through a network from a secure sever system, the key;
   store the key in the BIOS storage;
   receive the first certificate;
   validate the first certificate using the key; and
   store, in response to validating the first certificate, the first certificate in the secure storage subsystem.

9. The IHS of claim 8, further comprising:
a remote access controller that is coupled to the processing system, wherein the secure storage subsystem is included in the remote access controller.

10. The IHS of claim 7, wherein the BIOS engine is configured to:
receive the first certificate;
provide, through a network to a secure server system, the first certificate;
receive, through the network from the secure server system, a validation of the first certificate that is based on the key that is stored in the secure server system; and
store, in response to receiving the validation, the first certificate in the BIOS storage.

11. The IHS of claim 7, wherein the BIOS engine is configured to:
receive a second certificate;
determine that the second certificate cannot be validated using a key; and
ignore, in response to determining that the second certificate cannot be validated, the second certificate.

12. The IHS of claim 7, wherein the BIOS engine is configured to:
receive a second BIOS attribute modification request;
determine that the second BIOS attribute modification request cannot be authenticated using any certificates that were previously stored in the BIOS storage; and
ignore, in response to determining that the second BIOS attribute modification request cannot be authenticated, the second BIOS attribute modification request.

13. The IHS of claim 7, further comprising:
a BIOS interface coupled to the processing system, wherein the first certificate is received from a runtime engine via the BIOS interface.

14. A method for securing Basic Input/Output System (BIOS) attributes, comprising:
receiving, by a BIOS engine, a first BIOS attribute modification request;
authenticating, by the BIOS engine using a first certificate that was previously stored in a secure storage subsystem prior to the receiving the first BIOS attribute modification request and in response to validating the first certificate based on a key, the first BIOS attribute modification request; and
modifying, by the BIOS engine in response to authenticating the first BIOS attribute modification request using the first certificate, at least one BIOS attribute stored in a BIOS storage.

15. The method of claim 14, further comprising:
receiving, by the BIOS engine through a network from a secure sever system, the key;
storing, by the BIOS engine, the key in the BIOS storage;
receiving, by the BIOS engine, the first certificate;
validating, by the BIOS engine, the first certificate using the key; and
storing, by the BIOS engine in response to validating the first certificate, the first certificate in the secure storage subsystem.

16. The method of claim 15, wherein the secure storage subsystem is included in the remote access controller.

17. The method of claim 14, further comprising:
receiving, by the BIOS engine, the first certificate;
providing, by the BIOS engine through a network to a secure server system, the first certificate;
receiving, by the BIOS engine through the network from the secure server system, a validation of the first certificate that is based on the key that is stored in the secure server system; and
storing, by the BIOS engine in response to receiving the validation, the first certificate in the secure storage subsystem.

18. The method of claim 14, further comprising:
receiving, by the BIOS engine, a second certificate;
determining, by the BIOS engine, that the second certificate cannot be validated using a key; and
ignoring, by the BIOS engine in response to determining that the second certificate cannot be validated, the second certificate.

19. The method of claim 14, further comprising:
receiving, by the BIOS engine, a second BIOS attribute modification request;
determining, by the BIOS engine, that the second BIOS attribute modification request cannot be authenticated using any certificates that were previously stored in the BIOS storage; and
ignoring, by the BIOS engine in response to determining that the second BIOS attribute modification request cannot be authenticated, the second BIOS attribute modification request.

20. The method of claim 14, wherein the first certificate is received from a runtime engine via a BIOS interface that is coupled to the BIOS engine.

* * * * *